Oct. 3, 1933.        B. N. WILSON        1,928,715
EGG STAMP
Filed Oct. 21, 1932        2 Sheets-Sheet 1

Bernard N. Wilson
INVENTOR

WITNESS

BY
ATTORNEY

Oct. 3, 1933.  B. N. WILSON  1,928,715

EGG STAMP

Filed Oct. 21, 1932  2 Sheets-Sheet 2

Bernard N. Wilson
INVENTOR

WITNESS

BY

ATTORNEY

Patented Oct. 3, 1933

1,928,715

UNITED STATES PATENT OFFICE

1,928,715

EGG STAMP

Bernard N. Wilson, Chicago, Ill., assignor to Industrial Patents Corporation, Chicago, Ill., a corporation of Delaware Application October 21, 1932. Serial No. 638,927

2 Claims. (Cl. 101—379)

This invention relates to stamping devices adapted to impress or print characters on each of a plurality of regular or irregular objects simultaneously.

An object of this invention is to provide an egg stamp, although it will be understood that other objects may be branded if desired.

Another object of the invention is to provide a stamp which may be used to brand each of a group of eggs in conventional aggroupment.

Other objects of the invention will be apparent from the description and claims which follow.

In the drawings similar reference characters in the several figures indicate similar parts.

Figure 1:
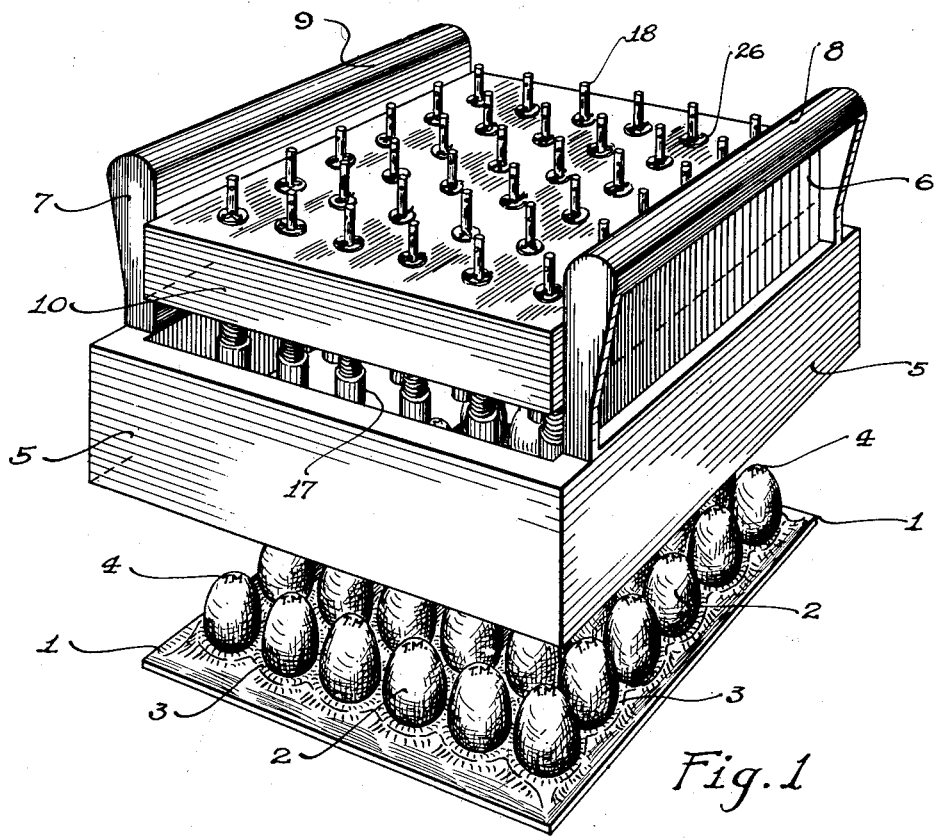
Figure 1 is a perspective view showing a preferred embodiment of the invention.
Figure 2:
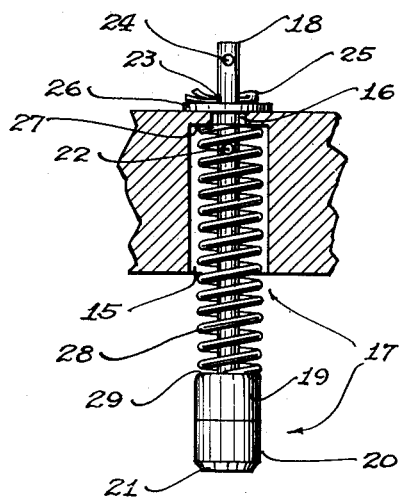
Figure 2 is a detail of a single stamping element.
Figure 3:
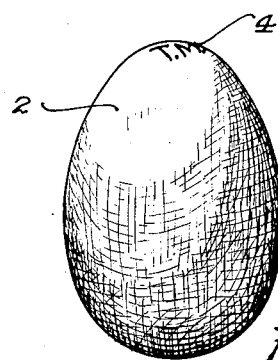
Figure 3 depicts an egg bearing a brand.
Figure 4:
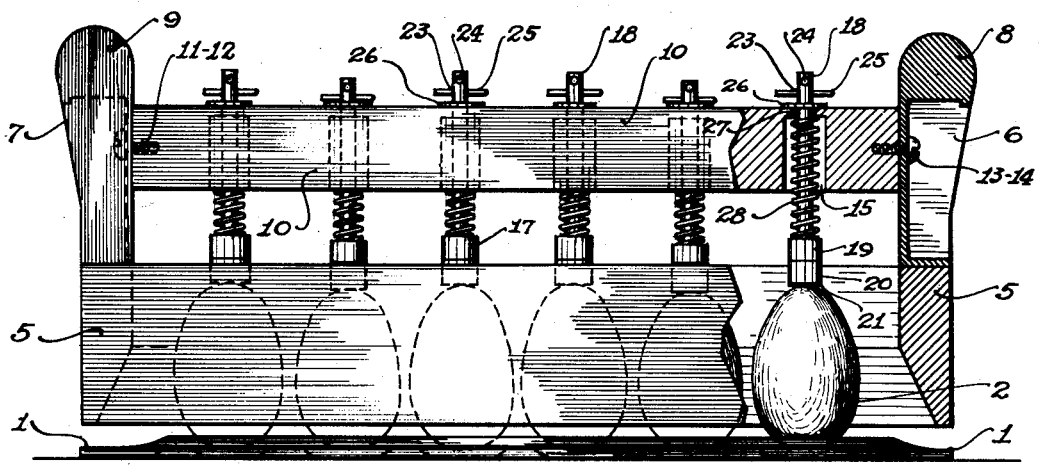
Figure 4 is a side view partly in section of the device shown in Figure 1.
Figure 5:
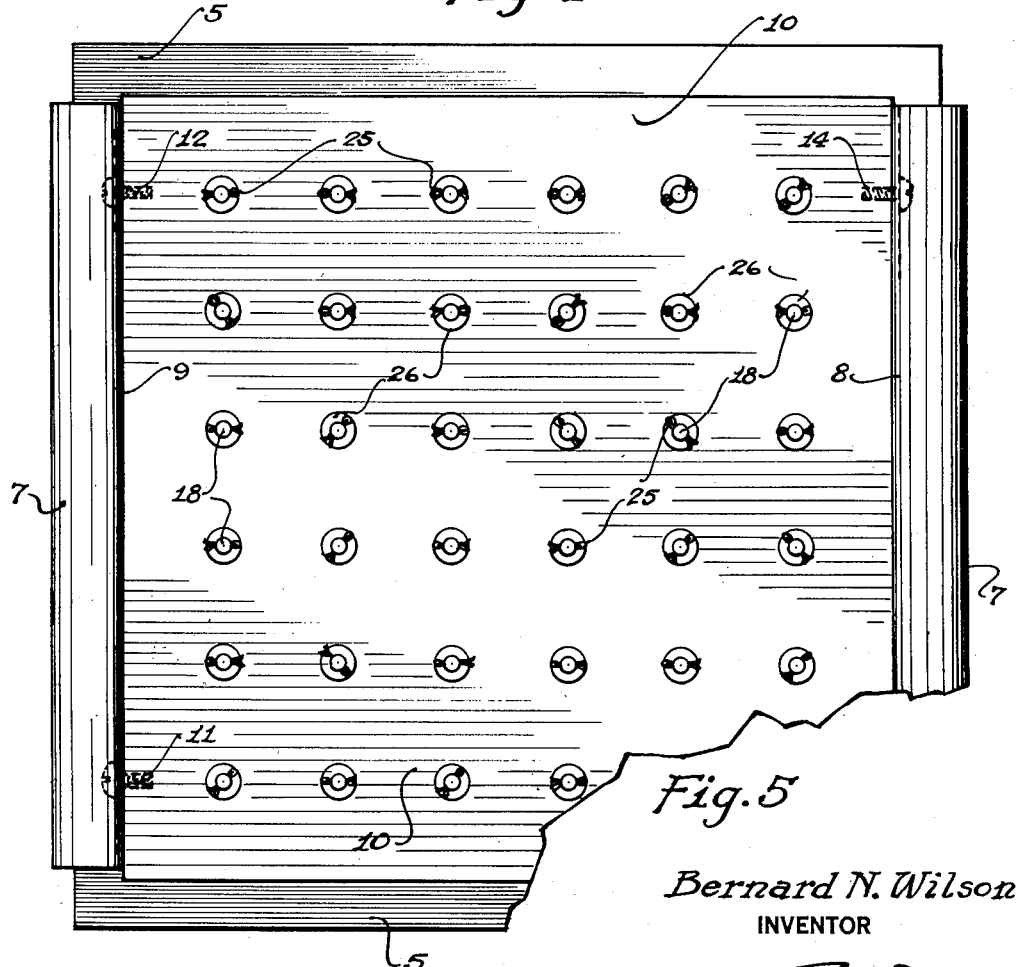
Figure 5 is a plan view partly in section of the device shown in Figure 1.

Referring now more particularly to Figure 1:

A conventional three-dozen style egg case filler 1 carries a full complement of individual eggs 2, here shown seated uprightly in pockets 3 and bearing "TM" brands 4. The frame 5 has inside dimensions appropriate to enable it to surround a standard size egg case filler, and is provided with handles 6 and 7 having grips 8 and 9. The header plate 10 is rigidly affixed to handles 6 and 7 by screws 11 and 12, and 13 and 14. Header plate 10 is provided with a plurality of pockets 15, one of which is shown in cross section in Figure 2. Pockets 15 communicate with the top of header plate 10 by openings 16. Individual branding elements 17 are mounted in pockets 15. Each branding element 17 is comprised of a stem 18 rigidly affixed to ring 19 on which is mounted sponge rubber or yieldable type foundation 20, type plate 21, which is preferably of type rubber is mounted on the yieldable foundation 20. A plurality of holes as 22, 23, and 24 are drilled through stem 18. A cotter pin 25 shielded by washer 26 is inserted through the desired hole as 23, to control the length of stem below end wall 27 of pocket 15. The branding element is urged downwardly by the compressed coil spring 28 abutting at end wall 27 and face 29 of cup or ring 19. Spring 28 and the length of stem 18 is adjusted such that when the device is placed over the conventional filler of eggs, the frame may be pressed down flush with the surface upon which the filler is resting and in such position assure branding contact with each egg.

In operation the operator grasps the handles 6 and 7 by grips 8 and 9, positions the frame over the filler of eggs and presses down until the frame rests flush on the table or conveyor, the frame acting as a guide for positioning the header plate. The branding elements operate independently and upon contact with the egg remain stationary as the header plate moves downwardly serving as a guide for the stems and a stop for the coil springs. The type may be inked in any desired manner as by contact with an inked pad.

The device which has heretofore been described provides a positive positioning of a plurality of branding elements, the frame serving as a guide. The device is simple and admits of sturdy construction. It provides a convenient and novel means for handling a filler of eggs after candling and immediately prior to actual placement in the case. The device has been particularly practicable in actual use in placing the country of origin mark "USA" on export eggs.

I claim:

1. A branding device comprising a frame adapted to act as a guide provided with handles and a rigidly affixed header plate, the plate being provided with a plurality of open pockets communicating with the upper surface of the header plate by apertures, said pockets being positioned at spaced intervals in said header plate, branding elements fitted in said pockets, each of said branding elements provided with a type face, a yieldable mounting for each type face, a rigid mounting for said yieldable mounting, said rigid mounting affixed to a stem adapted to be journaled slidably in the apertures in said pockets, said stems provided with holes through which pins may be inserted, a pin in one of said holes in each stem shielded from the upper surface of the header plate by a washer and a coil spring abutting the end of the pocket and the rigid mounting for the yieldable foundation of the type face.

2. A branding device comprising a frame adapted to act as a guide and a rigidly affixed header plate, the plate being provided with a plurality of open pockets communicating with the upper surface of the header plate by apertures, said pockets being positioned at spaced intervals in said header plate, branding elements fitted in said pockets and provided with stems adapted to be journaled slidably in the apertures, said stems provided with holes through which pins may be inserted, a pin in one of said holes in each stem shielded from the upper surface of the header plate by a washer and a coil spring abutting the end of the pocket and the branding element.

BERNARD N. WILSON.